US012801504B2

(12) United States Patent
Wan et al.

(10) Patent No.: US 12,801,504 B2
(45) Date of Patent: Nov. 17, 2026

(54) DETECTION METHOD FOR MEMORY STORAGE DEVICE AND NON-TRANSITORY COMPUTER-READABLE RECORDING MEDIUM

(71) Applicant: Hosin Global Electronics Co., LTD, Shenzhen (CN)

(72) Inventors: Jing Wan, Shenzhen (CN); Tsung-Lin Wu, Hsinchu City (TW); Chao-Yu Chen, Shenzhen (CN); Xiao Min Chen, Shenzhen (CN); Hai Liang Wu, Shenzhen (CN); Kai Qiang Meng, Shenzhen (CN); Qi Ming Zhu, Shenzhen (CN); Hao Wang, Shenzhen (CN); Wei Wang, Shenzhen (CN); Yuan Hong Ye, Shenzhen (CN)

(73) Assignee: Hosin Global Electronics Co., LTD, Shenzhen (CN)

( * ) Notice: Subject to any disclaimer, the term of this patent is extended or adjusted under 35 U.S.C. 154(b) by 0 days.

(21) Appl. No.: 19/084,656

(22) Filed: Mar. 19, 2025

(65) Prior Publication Data

US 2026/0017161 A1 Jan. 15, 2026

(30) Foreign Application Priority Data

Jul. 15, 2024 (CN) ......................... 202410940225.9

(51) Int. Cl.
*G06F 11/00* (2006.01)
*G06F 11/263* (2006.01)

(52) U.S. Cl.
CPC .................................. *G06F 11/263* (2013.01)

(58) Field of Classification Search
CPC ..................................................... G06F 11/263
See application file for complete search history.

(56) References Cited

U.S. PATENT DOCUMENTS

| | | | | |
|---|---|---|---|---|
| 5,436,912 | A * | 7/1995 | Lustig | G11C 29/44 714/719 |
| 10,536,549 | B2 * | 1/2020 | Venkataramanan | H04L 67/10 |
| 11,966,275 | B2 * | 4/2024 | Seyfi | G06N 20/00 |
| 12,002,261 | B2 * | 6/2024 | Staudigl | H04N 19/103 |
| 12,166,779 | B2 * | 12/2024 | Axenie | G06F 18/2178 |

(Continued)

*Primary Examiner* — Loan L. T. Truong
(74) *Attorney, Agent, or Firm* — JCIPRNET

(57) ABSTRACT

A detection method for a memory storage device and a non-transitory computer-readable recording medium are provided. The memory storage device includes a rewritable non-volatile memory module including physical tuples. The method includes: selecting a physical tuple from the physical tuples as a reference tuple, determining physical addresses according to a physical address of the reference tuple and predetermined address offsets, and treating the physical tuples corresponding to the physical addresses as contrast tuples; writing test data into the reference tuple; reading a first contrast tuple from the contrast tuples according to a first physical address among the physical addresses to obtain a first read result; and determining whether an addressing anomaly occurs according to the first read result and the test data. In this method, it can be determined whether an error occurs in an addressing process, and a location where an addressing anomaly occurs can be determined.

10 Claims, 3 Drawing Sheets

(56) References Cited

U.S. PATENT DOCUMENTS

| | | | | |
|---|---|---|---|---|
| 12,432,223 | B1 * | 9/2025 | Das | G05B 19/4063 |
| 12,688,424 | B2 * | 7/2026 | Allahdadian | G06N 3/084 |
| 2008/0016074 | A1 * | 1/2008 | Ben-Dyke | G06F 16/2246 |
| 2015/0082370 | A1 * | 3/2015 | Jayaraman | H04L 63/20 726/1 |
| 2018/0019968 | A1 * | 1/2018 | Redekop | H04L 63/0236 |
| 2019/0303562 | A1 * | 10/2019 | Masputra | G06F 12/084 |
| 2022/0042932 | A1 * | 2/2022 | Sun | G01T 1/2921 |
| 2022/0094711 | A1 * | 3/2022 | Krishnan | H04L 1/1657 |
| 2023/0305891 | A1 * | 9/2023 | Haywood | G06F 9/45558 |
| 2023/0419169 | A1 * | 12/2023 | Kobayashi | G06N 20/00 |
| 2024/0095231 | A1 * | 3/2024 | Pushak | G06N 3/045 |
| 2025/0233732 | A1 * | 7/2025 | Li | H04L 9/003 |
| 2025/0348470 | A1 * | 11/2025 | Abdelaal | G06F 16/215 |

* cited by examiner

DETECTION METHOD FOR MEMORY STORAGE DEVICE AND NON-TRANSITORY COMPUTER-READABLE RECORDING MEDIUM

CROSS-REFERENCE TO RELATED APPLICATION

This application claims the priority benefit of China application serial no. 202410940225.9, filed on Jul. 15, 2024. The entirety of the above-mentioned patent application is hereby incorporated by reference herein and made a part of this specification.

BACKGROUND

Technical Field

The disclosure relates to the field of storage technology, and in particular, relates to a detection method for a memory storage device and a non-transitory computer-readable recording medium.

Description of Related Art

In recent years, digital cameras, mobile phones, and MP3 players have grown rapidly, and consumers' demand for storage media has experienced a sharp increase as well. Due to its characteristics such as non-volatile data retention, low power consumption, small size, absence of mechanical structure, and fast access speed, rewritable non-volatile memory is most suitable for portable electronic products, such as notebook computers. Solid-state drives are a type of memory storage device that uses flash memory as the storage medium. Therefore, the flash memory industry has become a popular segment in the electronics industry in recent years.

In flash memory, addressing is required before writing or reading data, and typically, addressing requires issuing 5 to 6 addressing parameters and inputting the addressing parameters into the addressing register for decoding. In the address decoding logic, addresses and storage cell correspond one-to-one. Once a fault occurs in the address translation logic, large-scale overwrite errors may appear, resulting in the entire flash memory having to be discarded.

In view of the above, how to solve or improve the aforementioned problems is the goal that technical personnel in this field are committed to.

SUMMARY

The disclosure provides a detection method for a memory storage device capable of determining whether there is an error in an addressing process by reading a contrast tuple to determine whether test data in a reference tuple can be read and confirming a location where an addressing anomaly occurs.

An exemplary embodiment of the disclosure provides a detection method for a memory storage device. The memory storage device includes a rewritable non-volatile memory module, and the rewritable non-volatile memory module includes a plurality of physical tuples. The method includes the following steps. A physical tuple is selected from a plurality of physical tuples as a reference tuple, a plurality of physical addresses are determined according to a physical address of the reference tuple and a plurality of predetermined address offsets, and the physical tuples corresponding to the physical addresses are treated as a plurality of contrast tuples. Test data is written into the reference tuple. A first contrast tuple is read from the contrast tuples according to a first physical address among the physical addresses to obtain a first read result. It is determined whether an addressing anomaly occurs according to the first read result and the test data.

Whether there is an error in an addressing process of the first physical address is determined by reading the read result of the contrast tuples and the test data.

In an exemplary embodiment of the disclosure, the step of determining the physical addresses according to the physical address of the reference tuple and the predetermined address offsets includes the following: the physical address determined according to each of the predetermined address offsets is obtained, so as to determine a difference bit position with the physical address of the reference tuple.

In an exemplary embodiment of the disclosure, the step of selecting the physical tuple from the physical tuples as the reference tuple includes the following: the physical tuple with a smallest physical address is selected from the physical tuples as the reference tuple.

By selecting the physical tuple with the smallest physical address as the reference tuple, a larger or maximum range detection of the memory storage device is easily performed.

In an embodiment of the disclosure, the method further includes the following step. An erase operation is performed on the reference tuple and the contrast tuples before the step of writing the test data into the reference tuple is performed.

By performing an erase operation on the reference tuple and contrast tuples, the data originally stored on the reference tuple or the contrast tuples is prevented from affecting subsequent read results, and the detection results are thus prevented from being affected.

In an exemplary embodiment of the disclosure, the step of selecting the physical tuple from the physical tuples as the reference tuple and determining the physical addresses according to the physical address of the reference tuple and the predetermined address offsets includes the following: the number of the predetermined address offsets are determined according to the number of the physical tuples, and the physical addresses are determined according to the predetermined address offsets, so as to sequentially offset the difference bit position with the physical address of the reference tuple by one bit position.

In an exemplary embodiment of the disclosure, the step of determining whether an addressing anomaly occurs according to the first read result and the test data includes the following: a difference value in the number of bits with a same bit state between the first read result and the test data is obtained, and if the difference value does not exceed a predetermined threshold, it is determined that an addressing anomaly occurs.

Whether there is an error in the addressing process is determined by reading the contrast tuples and determining whether the test data in the reference tuple can be read.

In an embodiment of the disclosure, the method further includes the following steps. It is determined whether the first contrast tuple is a last contrast tuple among the plurality of contrast tuples. If the first contrast tuple is not the last contrast tuple, a second contrast tuple is read from the plurality of contrast tuples according to a second physical address among the plurality of physical addresses, so as to obtain a second read result. It is determined whether an addressing anomaly occurs according to the second read result and the test data.

By reading the reading results and test data of each contrast tuple, it is determined whether there is an error in the addressing process of the physical address of each contrast tuple.

In an exemplary embodiment of the disclosure, the step of if the difference value does not exceed the predetermined threshold, determining that an addressing anomaly occurs includes the following: the difference bit position between the first physical address and the physical address of the reference tuple is determined as an anomalous bit position. The physical tuples related to the anomalous bit position among the plurality of physical tuples are marked as anomalous.

The anomalous bit position is determined according to the difference bit position between the physical address of the contrast tuple where the abnormality occurs and the physical address of the reference tuple. The location where the addressing anomaly occurs in the memory device is determined according to the anomalous bit position, and the location where the addressing anomaly occurs can be marked as an anomaly.

In an exemplary embodiment of the disclosure, a valid physical address table is established, and the physical address corresponding to the physical tuple without an anomalous mark is recorded to be used for executing a data storage operation.

By establishing the valid physical address table, data may be stored in the physical addresses without anomalies according to the valid physical address table, stability and usage flexibility of the memory storage device is thereby improved.

An exemplary embodiment of the disclosure further provides a non-transitory computer-readable recording medium storing a program or an instruction. After being loaded by a processor, the various steps of a detection method for a memory storage device are executed.

To sum up, the disclosure provides a detection method for a memory storage device and a non-transitory computer-readable recording medium. By determining if the test data in the reference tuple can be read from the contrast tuples, whether there is an error in the addressing process is determined, and the location of addressing anomaly is confirmed. As such, the inability to perform an access operation on the storage device when addressing anomalies occur is avoided, and the stability and usage flexibility of the memory storage device is effectively improved.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the disclosure, and the accompanying drawings are incorporated in and constitute a part of this specification. The drawings illustrate the embodiments of the disclosure, and together with the description, serve to explain the principle of the disclosure.

DESCRIPTION OF THE EMBODIMENTS

Figure 1:
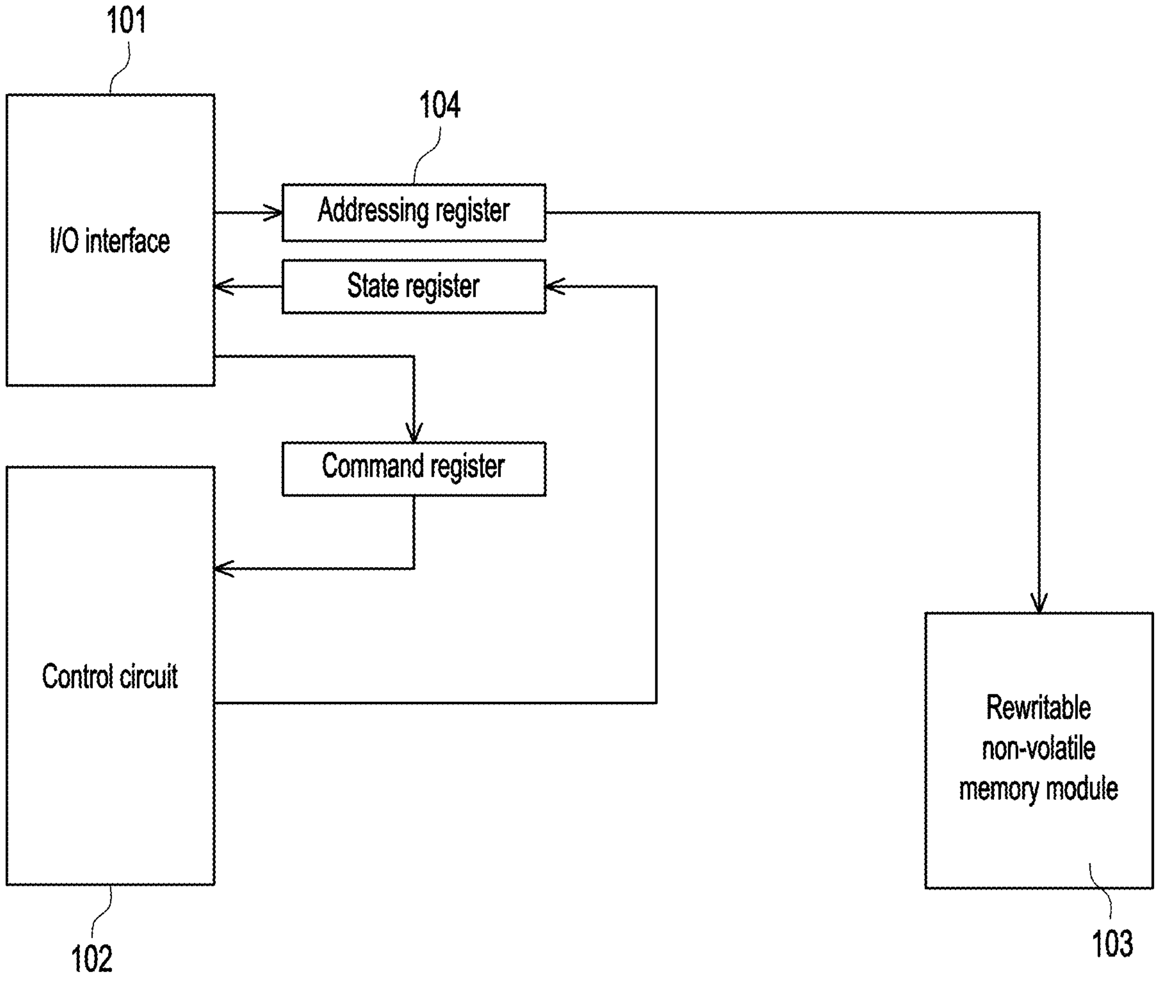
FIG. 1 is a schematic view of a memory storage device according to an exemplary embodiment of the disclosure.

Descriptions of the disclosure are given with reference to the exemplary embodiments illustrated by the accompanying drawings. Wherever possible, the same reference numbers are used in the drawings and the description to refer to the same or like parts.

The ordinal numbers used in the specification and claims of the disclosure, such as "first", "second", etc., are used to modify the elements, and they do not imply or represent the (or these) elements have any previous ordinal numbers, do not represent the order of an element and another element, or the order of a manufacturing method. The use of these ordinal numbers is only used to clearly distinguish an element with a certain name from another element with the same name. The terms used in the claims and the specification may not have to be the same, and accordingly, the first component provided in the specification may be the second component in the claims. It should be understood that in the following embodiments, the technical features of several different embodiments may be replaced, recombined, and mixed to complete other embodiments without departing from the spirit of the disclosure.

FIG. 1 is a schematic view of a memory storage device according to an exemplary embodiment of the disclosure. Referring to FIG. 1, generally, a memory storage device (also referred to as a storage device) includes an input/output (I/O) interface 101, an overwritable non-volatile memory module 103, and a control circuit 102. Typically, the memory storage device is used together with a host system (not shown), so that the host system may transmit an addressing command through the I/O interface 101 and through an address register 104 to write data to or read data from the memory storage device.

The I/O interface 101 is coupled to the host system and is used to receive and identify instructions and data transmitted by the host system. In other words, the instructions and data transmitted by the host system are transferred to the control circuit 102 through the I/O interface 101.

The control circuit 102 is used to execute a plurality of logic gates or control instructions implemented in a hardware or firmware form and perform operations such as writing, reading, and erasing data in the rewritable non-volatile memory module 103 according to the instructions from the host system. In an exemplary embodiment, the control circuit 102 may issue other types of instructions from the host system to the rewritable non-volatile memory module 103 to indicate the execution of corresponding operations.

In an exemplary embodiment, the rewritable non-volatile memory module 103 may be various types of non-volatile memory storage devices such as SD cards, CF cards, or embedded storage devices. The embedded storage devices include various types of embedded storage devices that directly couple the memory module to a substrate of the host system, such as embedded multimedia cards (embedded MMC, eMMC) and/or embedded multi chip package (eMCP) storage devices.

The rewritable non-volatile memory module 103 is coupled to the control circuit 102 and is used to store data written by the host system. The rewritable non-volatile memory module 103 may be a single level cell (SLC) NAND flash memory module (i.e., a flash memory module capable of storing 1 data bit in one memory cell), a multi level cell (MLC) NAND flash memory module (i.e., a flash memory module capable of storing 2 data bits in one memory cell), a triple level cell (TLC) NAND flash memory module (i.e., a flash memory module capable of storing 3 data bits in one memory cell), a quad level cell (QLC) NAND flash memory module (i.e., a flash memory module capable of storing 4 data bits in one memory cell), other flash memory modules, or other memory modules having the same features.

Each read and write operation of the rewritable non-volatile memory module 103 needs to be completed through the addressing register 104. When a bit position addressing anomaly occurs in the addressing register 104, the addressing register 104 exhibits an inability to write data, meaning that specific bits in some bytes are unable to represent two states (0 or 1) numerically, and can only remain constant in one state (for example, always 1 or always 0).

At this time, if the host system is unaware of the anomaly, an error situation may occur where data is repeatedly written to a same physical address. Due to the physical nature of the rewritable non-volatile memory module 103, which cannot be directly rewritten, when a bit position addressing anomaly occurs in the addressing register 104, it may result in the entire rewritable non-volatile memory module 103 becoming unusable.

Figure 2:
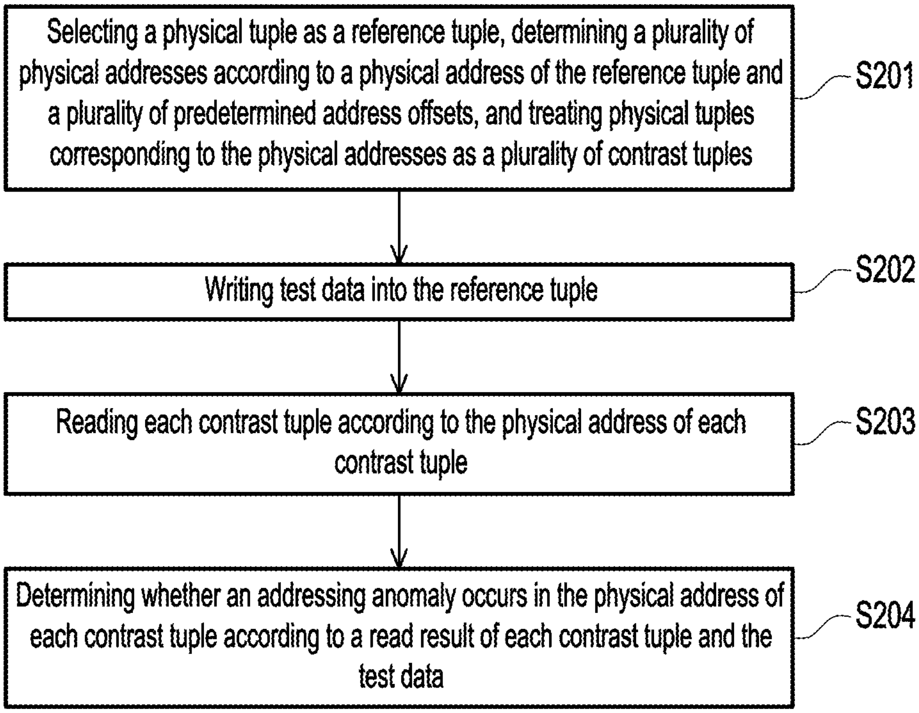
FIG. 2 is a flow chart of a detection method for the memory storage device according to an exemplary embodiment of the disclosure.

The disclosure provides a detection method for a memory storage device. FIG. 2 is a flow chart of the detection method for the memory storage device according to an exemplary embodiment of the disclosure.

In S201, in a rewritable non-volatile memory module, a physical tuple is selected as a reference tuple, a plurality of physical addresses are determined according to a physical address of the reference tuple and a plurality of predetermined address offsets, and physical tuples corresponding to the physical addresses are treated as a plurality of contrast tuples.

In S202, test data is written into the reference tuple.

In S203, each contrast tuple is read according to the physical address of each contrast tuple.

In S204, it is determined whether an addressing anomaly occurs in the physical address of each contrast tuple according to a read result of each contrast tuple and the test data.

It is determined whether an addressing anomaly occurs in the physical address of each contrast tuple through the read result of each contrast tuple and the test data.

During a read and write process, the memory storage device may not only address by block address and page address, but also may address by logical unit group (LUN) address, column address, and row address. Therefore, in the disclosure, a logical unit group, a physical block, a physical page, a column, or a row may be used as a physical tuple to perform the detection method described in FIG. 2.

Figure 3:
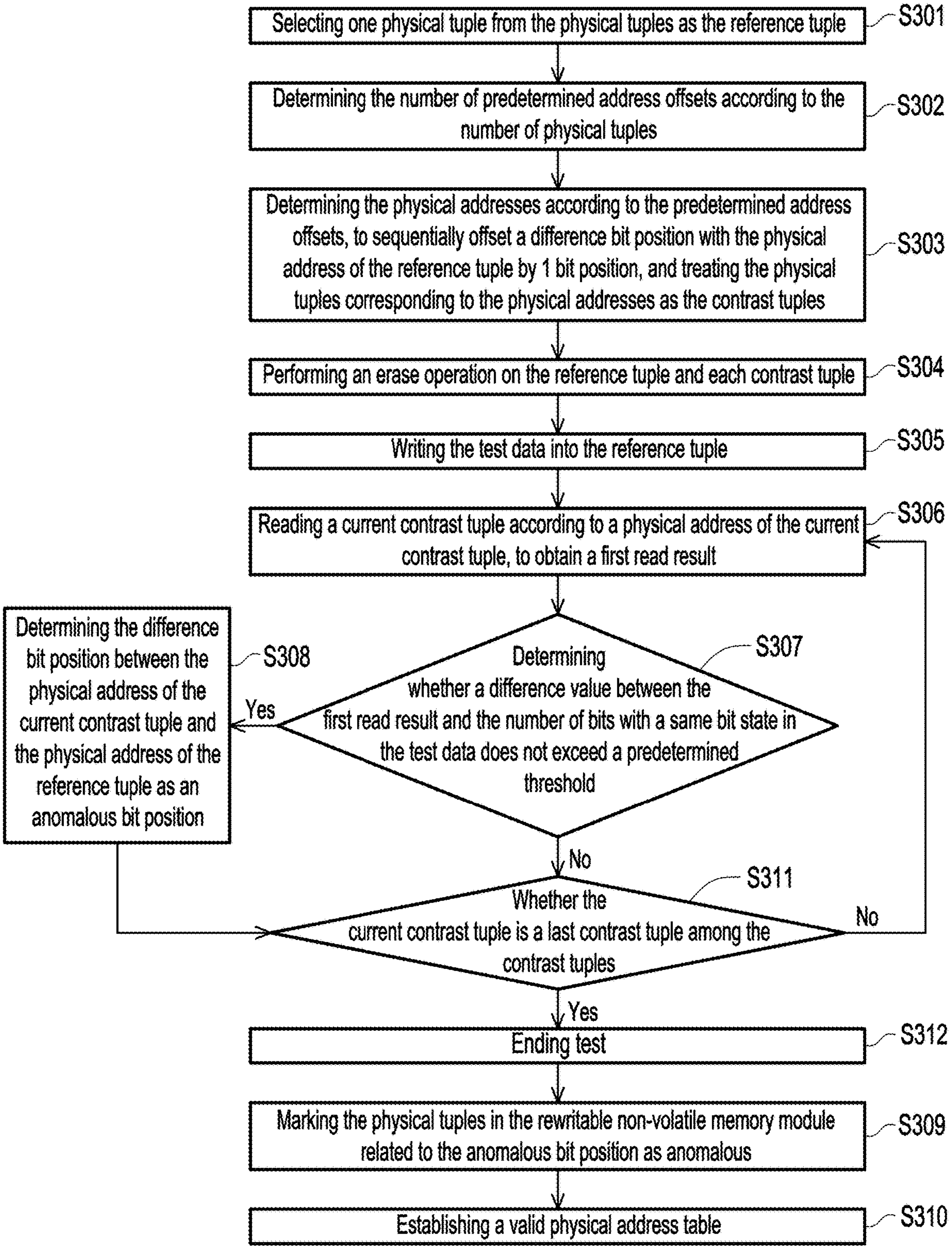
FIG. 3 is a flow chart of a detection method for the memory storage device according to another exemplary embodiment of the disclosure.

FIG. 3 is a flow chart of a detection method for the memory storage device according to an exemplary embodiment of the disclosure. Herein, the memory storage device includes a rewritable non-volatile memory module, and the rewritable non-volatile memory module includes a plurality of physical tuples. The steps of the method may be adjusted according to actual implementation and are not limited by the disclosure.

In step S301, one physical tuple is selected from the physical tuples as the reference tuple. In an embodiment, the physical tuple with a smallest physical address may be selected from the physical tuples as the reference tuple.

By selecting the physical tuple with the smallest physical address in the rewritable non-volatile memory module as the reference tuple, a larger or maximum range detection of the memory storage device may be easily performed.

In the following, steps S302 to S303 are combined to specifically explain how to determine the plurality of physical addresses according to the physical address of the reference tuple and the predetermined address offsets, and the physical tuples corresponding to the physical addresses are used as the contrast tuples.

In step S302, the number of predetermined address offsets are determined according to the number of physical tuples in the rewritable non-volatile memory module.

Each predetermined address offset may determine one contrast tuple, so the number of predetermined address offsets is determined by the number of required contrast tuples. As the total number of physical tuples increases, the address bit positions used increase, and increased contrast tuples are required for anomaly detection. Since each bit position may represent 2 addresses (0 or 1), the number of address bit positions used by the rewritable non-volatile memory module may be obtained through a logarithmic function based on the number of physical tuples, to serve as the number of predetermined address offsets.

In an exemplary embodiment, an explanation is provided using an example where a current addressing target includes 16 physical blocks, and the physical address of the reference block is 0b0000.

The number of address bit positions used by the rewritable non-volatile memory module is obtained as the number of predetermined address offsets, which is also the number of contrast blocks (Contrast Block Num), according to the number of physical blocks (Flash Block Num) and the logarithmic function in Formula 1. The following is Formula 1:

$$\text{Contrast Block } Num = \log_2(\text{Flash Block } Num),$$

When the number of physical blocks is 16, according to Formula 1, the number of address bit positions used by the physical blocks is 4. To detect a state of each address bit position, the number of contrast blocks (the number of predetermined address offsets) needed is 4, and the contrast blocks may be, for example, Contrast Block0, Contrast Block1, Contrast Block2, and Contrast Block3.

In step S303, the physical addresses are determined according to the predetermined address offsets, to sequentially offset a difference bit position with the physical address of the reference tuple by one bit position, and the physical tuples corresponding to the physical addresses are treated as the contrast tuples.

In an exemplary embodiment, the physical address determined according to each of the predetermined address offsets may be obtained, so as to determine one difference bit position with the physical address of the reference tuple, which is used to detect the state of each address bit.

In an exemplary embodiment, exponentially increasing address distances are used as the predetermined address offsets, and the physical addresses of the contrast tuples are obtained from near to far based on the predetermined address offsets, starting from the physical address of the reference tuple. Each obtained physical address of the contrast tuple has one difference bit position with the physical address of the reference tuple, and each difference bit position is sequentially offset by one bit position.

To be specific, following the abovementioned embodiments, which use 16 physical blocks and the physical address of the reference block as 0b0000 as an example for explanation, in an exemplary embodiment, the physical address (Contrast Block address) of each contrast block may be obtained according to the number of contrast blocks, Formula 2, and the physical address of the reference block (ReferBlock address). Formula 2 is as follows:

$$\text{Contrast Block address} = 2^i \mid \textit{ReferBlock}\text{ address, where}$$
$$i \in [0, \text{Contrast Block } \textit{Num} - 1],$$

where a plurality of predetermined address offsets are obtained by $2^i$, and it can be determined through step 302 that the number of predetermined address offsets is 4. Therefore, the physical address 0b0000 of the reference block is used as the starting bit, and the physical blocks with distances of 2, 4, 8, and 16 (i.e., 0001, 0010, 0100 and 1000) from the reference block are used as contrast blocks. The physical address each contrast block is obtained by performing an OR operation on the predetermined address offsets and the physical address of the reference block. The physical addresses of the contrast blocks are as follows:

$$\text{Contrast Block0 address} = 0001 \mid 0b0000 = 0b0001,$$
$$\text{Contrast Block1 address} = 0010 \mid 0b0000 = 0b0010,$$
$$\text{Contrast Block2 address} = 0100 \mid 0b0000 = 0b0100, \text{ and}$$
$$\text{Contrast Block3 address} = 1000 \mid 0b0000 = 0b1000.$$

Further, the physical addresses (0b0001, 0b0010, 0b0100, and 0b1000) determined according to each predetermined address offset may be obtained, so as to determine one difference bit position with the physical address (0b0000) of the reference block.

First, from the address offset of 2, the physical address 0b0001 may be obtained, and the corresponding physical block is used as the contrast block Contrast block 0. A first difference bit position between the physical address 0b0001 of the contrast block and the physical address 0b0000 of the reference block is obtained.

Next, from the address offset of 4, the physical address 0b0010 may be obtained, and the corresponding physical block is used as the contrast block Contrast block 1. A second difference bit position between the physical address 0b0010 of the contrast block and the physical address 0b0000 of the reference block is obtained. The first difference bit position and the second difference bit position are different, and the second difference bit position is offset one bit position to the left compared to the first difference bit position.

Next, from the address offset of 8, the physical address 0b0100 may be obtained, and the corresponding physical block is used as the contrast block Contrast block 2. A third difference bit position between the physical address 0b0100 of the contrast block and the physical address 0b0000 of the reference block is obtained. The first difference bit position, the second difference bit position, and the third difference bit position are different, and the third difference bit position is offset one bit position to the left compared to the second difference bit position.

Finally, from the address offset of 16, the physical address 0b1000 may be obtained, and the corresponding physical block is used as the contrast block Contrast block 3. A fourth difference bit position between the physical address 0b1000 of the contrast block and the physical address 0b0000 of the reference block is obtained. The first difference bit position, the second difference bit position, the third difference bit position, and the fourth difference bit position are different, and the fourth difference bit position is offset one bit position to the left compared to the third difference bit position.

In another example, taking the number of contrast blocks as 4 and the physical address of the reference block as 0b0001 as an example, starting from the physical address 0b0001 of the reference block, the physical blocks with distances of 2, 4, 8, and 16 (i.e., 0001, 0010, 0100, and 1000) from the reference block are used as contrast blocks. The physical addresses (Contrast Block address) of each contrast block may be obtained based on the number of contrast blocks, Formula 2, and the physical address of the reference block. Herein, the physical addresses the contrast blocks are shown as follows:

$$\text{Contrast Block0 address} = 0001 \mid 0b0001 = 0b0001,$$
$$\text{Contrast Block1 address} = 0010 \mid 0b0001 = 0b0011,$$
$$\text{Contrast Block2 address} = 0100 \mid 0b0001 = 0b0101, \text{ and}$$
$$\text{Contrast Block3 address} = 1000 \mid 0b0001 = 0b1001,$$

where from the address offset of 2, the physical address 0b0001 is obtained, which is the same as the physical address of the reference block, so a smallest starting address 0b0000 is selected as a replacement. According to the plurality of predetermined address offsets, the physical address 0b0000 of the contrast block Contrast block 0, the physical address 0b0011 of the contrast block Contrast block 1, the physical address 0b0101 of the contrast block Contrast block 2, and the physical address 0b1001 of the contrast block Contrast block 3 are determined in sequence. The physical address of each contrast block has one difference bit position with the physical address of the reference block, and each difference bit position is offset by one bit position.

In the above example, through the OR operation between the power of 2 exponents and the physical address of the reference block in Formula 2, the physical addresses are obtained where the difference bit positions with the physical address of the reference block are offset by one bit position in sequence, and the physical blocks corresponding to the physical addresses are used as the contrast blocks.

In step S304, an erase operation is performed on the above reference tuple and each contrast tuple to clear the data on the reference tuple and each contrast tuple.

By performing an erase operation on the reference tuple and contrast tuples, the data originally stored on the reference tuple or the contrast tuples is prevented from affecting subsequent read results, and the detection results are thus prevented from being affected.

In step S305, the test data is written into the reference tuple.

In step S306, one contrast tuple is selected from each contrast tuple as a current contrast tuple, and the current contrast tuple is read according to a physical address of the current contrast tuple to obtain a first read result.

In step S307, it is determined whether a difference value between the first read result and the number of bits with a same bit state in the test data does not exceed a predetermined threshold. As mentioned above, since bits may be represented numerically in two bit states ("0" or "1"), in an exemplary embodiment, the numbers of bits with the same "0" bit state in the read result of the current contrast tuple and the test data may be counted, and the difference value between the numbers of bits with the "0" bit state in both may be calculated. Next, it is determined whether this difference value does not exceed the predetermined threshold to determine if an addressing anomaly occurs.

In another exemplary embodiment, the numbers of bits with the same "1" bit state in the read result of the current contrast tuple and the test data may be counted, and the difference value between the numbers of bits with the "1" bit state in both may be calculated. Next, it is determined whether this difference value does not exceed the predetermined threshold to determine if an addressing anomaly occurs.

In an example embodiment, the predetermined threshold may be set to 10. If the number of bits with the "0" bit state in the read result of the current contrast tuple is counted as 100, for example, the number of bits with the "0" bit state in the test data is counted as 98, for example, and the difference value between the numbers of bits with the "0" bit state in both is calculated as 2, this difference value does not exceed the predetermined threshold (10), indicating that the read result of the current contrast tuple is highly similar to the test data. In this case, it may be determined that an addressing anomaly occurs.

In another embodiment, if the number of bits with the "1" bit state in the read result of the current contrast tuple is counted as 100, for example, the number of bits with the "1" bit state in the test data is counted as 20, for example, and the difference value between the numbers of bits with the "1" bit state in both is calculated as 80, this difference value far exceeds the predetermined threshold (10), indicating that the read result of the current contrast tuple is not similar to the test data. In this case, it may be determined that no addressing anomaly occurs.

The smaller the difference value between the first read result and the number of bits with the same bit state in the test data, the higher the similarity between the data read from the current contrast tuple and the test data. This indicates a higher possibility of data being repeatedly written to the same physical address, and a greater possibility of an addressing anomaly occurring. A user may set the predetermined threshold based on experience, which is not limited by the disclosure.

If the difference value between the read result of the current contrast tuple and the number of bits with the same bit state in the test data does not exceed the predetermined threshold, it is determined that an addressing anomaly occurs. In step S308, the difference bit position between the physical address of the current contrast tuple and the physical address of the reference tuple is determined as an anomalous bit position.

In an embodiment, if the physical address of the current contrast tuple with an addressing anomaly is 0010 and the physical address of the reference tuple is 0000, since the address difference between the physical address of each contrast tuple and the physical address of the reference tuple is only 1 bit, the difference bit position may be determined as the position where an anomaly occurs (i.e., the anomalous bit position) according to the physical address (0010) of the current contrast tuple and the physical address (0000) of the reference tuple. In this embodiment, the anomalous bit position is the second bit position from right to left in the physical address.

In step S311, it is determined whether the current contrast tuple is a last contrast tuple among the contrast tuples.

If the current contrast tuple is the last contrast tuple among the contrast tuples, the test is ended in step S312.

If the current contrast tuple is not the last contrast tuple, the process returns to step S307 to continue reading the remaining contrast tuples in order to determine whether there are any other bit positions with addressing anomalies. This continues until all contrast tuples are read and determined for addressing anomalies one by one, at which point the test ends.

After the test ends, in step S309, the physical tuples in the rewritable non-volatile memory module related to the anomalous bit position are marked as anomalous.

After the anomalous bit position is determined, all physical addresses related to the anomalous bit position are unable to be addressed normally. Therefore, the physical tuples corresponding to the physical addresses related to the anomalous bit position are also unable to be used. The physical tuples related to the anomalous bit position are marked as anomalous.

In an embodiment, following the previous embodiments where the anomalous bit position is the second bit position from right to left in the physical address, the physical tuples related to the aforementioned anomalous bit position include the physical tuples with physical addresses 0010, 0011, 0110, 0111, 1010, 1011, 1110, and 1111. That is, all physical addresses involving changes in the anomalous bit position are unable to be addressed normally.

Further, the physical tuples with the physical addresses 0010, 0011, 0110, 0111, 1010, 1011, 1110, and 1111 may be marked as anomalous. Subsequently, the host system no longer writes data to the physical tuples with the physical addresses 0010, 0011, 0110, 0111, 1010, 1011, 1110, and 1111.

In step S310, a valid physical address table is established, and the physical address corresponding to the physical tuple without an anomalous mark is recorded to be used for executing a data storage operation.

After executing the aforementioned anomaly processing, a valid physical address table may be established to record the physical addresses corresponding to physical tuples that do not carry the anomalous marks. In this embodiment, the physical tuples corresponding to the physical addresses 0000, 0001, 0100, 0101, 1000, 1001, 1100, and 1101 are physical tuples without the anomalous marks. The aforementioned physical addresses do not involve addressing the anomalous bit position when writing data.

The host system may execute data storage operations based on the physical addresses corresponding to the physical tuples without anomalous marks recorded in the valid physical address table. Although half of the storage space is lost due to physical tuples carrying anomalous marks, the host system may still write data to the physical addresses corresponding to other physical tuples without anomalous marks. This ensures that the rewritable non-volatile memory module may be used normally, without the need to discard the entire rewritable non-volatile memory module.

By establishing the valid physical address table, data may be stored in the physical addresses without anomalies according to the valid physical address table, stability and usage flexibility of the memory storage device is thereby improved.

If the difference value between the number of bits with the same bit state in the read result of the current contrast tuple and the test data exceeds the predetermined threshold, it is determined that no addressing anomaly occurs.

In step S311, it is determined whether the current contrast tuple is the last contrast tuple among the contrast tuples.

If the current contrast tuple is the last contrast tuple among the contrast tuples, the test is ended in step S312.

If the current contrast tuple is not the last contrast tuple, the process returns to step S307 to continue reading the remaining contrast tuples in order to determine whether there are any addressing anomalies. This continues until all contrast tuples are read and determined for addressing anomalies one by one, at which point the test ends.

In an exemplary embodiment, the detection method of the aforementioned memory storage device may also perform detection in units of physical pages. In this exemplary embodiment, the physical tuple may be a physical page.

To be specific, taking as an example that each physical block in the rewritable non-volatile memory module includes 32 physical pages, a physical page with a smaller physical address, such as a physical address of 0x00000, is selected as a reference page.

Similarly, the number of predetermined address offsets, which is also the number of contrast pages, may be obtained according to the number of physical pages using Formula 3. The following is Formula 3:

$$\text{Contrast Page } Num = \log_2(\text{Flash Page } Num).$$

When the number of physical pages (Flash Page Num) is 32, according to Formula 3, the number of contrast pages Contrast Page Num is 5, and the contrast pages may be, for example, Contrast Page 0, Contrast Page 1, Contrast Page 2, Contrast Page 3, and Contrast Page 4.

In an exemplary embodiment, the physical addresses of each contrast page (Contrast Page address) may be obtained according to the number of contrast pages, Formula 4, and the physical address of the reference page (Refer Page address). Formula 4 is as follows:

$$\text{Contrast Page address} = 2^i \mid \text{Refer Page address, where } i \in [0, \text{Contrast Page } Num - 1],$$

where the physical address of the reference page (Refer Page address) is 0x00000, the physical addresses of the contrast pages are shown as follows:

$$\text{Contrast Page 0 address} = 00001 \mid \text{Refer Page address,}$$

$$\text{Contrast Page 1 address} = 00010 \mid \text{Refer Page address,}$$

$$\text{Contrast Page 2 address} = 00100 \mid \text{Refer Page address,}$$

$$\text{Contrast Page 3 address} = 01000 \mid \text{Refer Page address, and}$$

$$\text{Contrast Page 4 address} = 10000 \mid \text{Refer Page address.}$$

In this embodiment, according to the physical addresses (0x00001, 0x00010, 0x00100, 0x01000, and 0x10000) determined according to the predetermined address offsets, one difference bit position is confirmed with the physical address (0x00000) of the reference page.

In this embodiment, the aforementioned reference page and contrast pages are all blank pages. The test data is written into the reference page, and read operations are performed on each contrast page sequentially according to the physical addresses of the contrast pages to obtain the read results of the contrast pages.

The read results of the contrast pages and the test data are compared to determine whether the difference value between the number of bits with the same bit state in the read results of the contrast pages and the test data does not exceed the predetermined threshold, in order to determine whether an addressing anomaly occurs.

In an exemplary embodiment, the numbers of bits with the same "0" bit state in the read result of a current contrast page and the test data may be counted, and the difference value between the numbers of bits with the "0" bit state in both may be calculated. Next, it is determined whether this difference value does not exceed the predetermined threshold to determine if an addressing anomaly occurs.

In another exemplary embodiment, the numbers of bits with the same "1" bit state in the read result of the current contrast page and the test data may be counted, and the difference value between the numbers of bits with the "1" bit state in both may be calculated. Next, it is determined whether this difference value does not exceed the predetermined threshold to determine if an addressing anomaly occurs.

If the difference value between the numbers of bits with the same bit state in the read results of the current contrast page and the test data exceeds the predetermined threshold, it is determined that no addressing anomaly occurs, and the read operation continues to be performed on other contrast pages until all contrast pages are read one by one and determined for the occurrence of addressing anomalies, at which point the test ends.

If the difference value between the read result of the current contrast page and the number of bits with the same bit state in the test data does not exceed the predetermined threshold, it is determined that an addressing anomaly occurs.

In an embodiment, taking the current contrast page as the contrast page Contrast Page3 (with a physical page address of 0x01000) as an example, if the difference value between the numbers of bits with the same bit state in the read results obtained from contrast page Contrast Page3 and the test data does not exceed the predetermined threshold, then based on the difference bit positions, it is determined that an addressing anomaly occurs in the fourth bit position from right to left.

At this point, due to the occurrence of a page-level addressing anomaly, only SLC mode may be used to perform access operations on the rewritable non-volatile memory module that is originally MLC, TLC, or QLC NAND type.

After anomaly processing is performed on the physical addresses involved in the aforementioned anomalous bit position, the host system may still use the SLC mode to perform access operations on the physical pages corresponding to valid physical addresses, which means using the rewritable non-volatile memory module as an SLC NAND type flash memory module to execute the subsequent access operations.

In some embodiments, the above detection steps may be performed when more errors occur during the read and write process of the memory storage device, or the memory storage device may be subjected to regular self-test. For instance, a predetermined time interval may be set to execute the above detection steps on the memory storage device, the location where the addressing anomaly occurs on the memory storage device may be determined through detection, and a valid physical address table may be established to record the physical addresses where no anomalies occur, so that data may be stored in the physical addresses where no anomalies occur, the stability and usage flexibility of the memory storage device is thereby effectively improved.

The embodiments of the disclosure also provide a non-transitory computer-readable recording medium storing a program or an instruction. When the program or instruction is executed by a processor, the steps of the method in the aforementioned embodiments are performed, and the same technical effects may be achieved. To avoid repetition, further details are not provided herein.

Through the description of the above implementation method, a person having ordinary skill in the art may clearly understand that the method of the aforementioned embodiments may be implemented by means of software plus necessary general hardware platforms, and certainly it may also be implemented through hardware, but in many cases the former is a better implementation. Based on this understanding, the technical solution of the disclosure or the part that contributes to the related art may be embodied in the form of a computer software product, and the computer software product is stored in a storage medium (e.g., ROM/RAM, magnetic disk, or optical disk) and includes several instructions for enabling a terminal (which may be a mobile phone, computer, server, or network device, etc.) to execute the method described in each embodiment of the disclosure.

In view of the foregoing, in the exemplary embodiments of the disclosure, a detection method for a memory storage device and a non-transitory computer-readable recording medium are provided. By determining if the test data in the reference tuple may be read from the contrast tuples, whether there is an error in the addressing process may be determined, and the location of addressing anomaly may be confirmed. As such, the inability to perform an access operation on the storage device when addressing anomalies occur is avoided, and the stability and usage flexibility of the memory storage device is effectively improved.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A detection method for a memory storage device, comprising a rewritable non-volatile memory module, wherein the rewritable non-volatile memory module comprises a plurality of physical tuples, each physical tuple corresponding to a logical unit group, a physical block, a physical page, a column, or a row of the rewritable non-volatile memory module, and the detection method comprises:

selecting a physical tuple from the plurality of physical tuples as a reference tuple, determining a plurality of physical addresses according to a physical address of the reference tuple and a plurality of predetermined address offsets, and treating the plurality of physical tuples corresponding to the plurality of physical addresses as a plurality of contrast tuples;

writing test data into the reference tuple;

reading a first contrast tuple from the plurality of contrast tuples according to a first physical address among the plurality of physical addresses to obtain a first read result; and determining whether an addressing anomaly occurs according to the first read result and the test data.

2. The detection method according to claim 1, wherein the step of determining the plurality of physical addresses according to the physical address of the reference tuple and the plurality of predetermined address offsets further comprises:

obtaining the physical address determined according to each of the plurality of predetermined address offsets, to determine a difference bit position with the physical address of the reference tuple.

3. The detection method according to claim 1, wherein the step of selecting the physical tuple from the plurality of physical tuples as the reference tuple further comprises:

selecting the physical tuple with a smallest physical address from the plurality of physical tuples as the reference tuple.

4. The detection method according to claim 1, further comprising:

performing an erase operation on the reference tuple and the plurality of contrast tuples before the step of writing the test data into the reference tuple.

5. The detection method according to claim 2, wherein the step of selecting the physical tuple from the plurality of physical tuples as the reference tuple and determining the plurality of physical addresses according to the physical address of the reference tuple and the plurality of predetermined address offsets comprises:

determining the number of the plurality of predetermined address offsets according to the number of the plurality of physical tuples; and determining the plurality of physical addresses according to the plurality of predetermined address offsets, to sequentially offset the difference bit position with the physical address of the reference tuple by one bit position.

6. The detection method according to claim 1, wherein the step of determining whether an addressing anomaly occurs according to the first read result and the test data comprises:

obtaining a difference value in the number of bits with a same bit state between the first read result and the test data, and if the difference value does not exceed a predetermined threshold, determining that an addressing anomaly occurs.

7. The detection method according to claim 1, further comprising:

determining whether the first contrast tuple is a last contrast tuple among the plurality of contrast tuples;

if the first contrast tuple is not the last contrast tuple, reading a second contrast tuple from the plurality of contrast tuples according to a second physical address among the plurality of physical addresses, to obtain a second read result; and determining whether an addressing anomaly occurs according to the second read result and the test data.

8. The detection method according to claim 6, wherein the step of if the difference value does not exceed the predetermined threshold, determining that an addressing anomaly occurs comprises:

determining the difference bit position between the first physical address and the physical address of the reference tuple as an anomalous bit position; and marking the physical tuples related to the anomalous bit position among the plurality of physical tuples as anomalous.

9. The detection method according to claim 8, further comprising:

establishing a valid physical address table and recording the physical address corresponding to the physical tuple without an anomalous mark to be used for executing a data storage operation.

10. A non-transitory computer-readable recording medium, storing an instruction loaded by a processor to execute the detection method according to claim 1.

* * * * *